G. TURNER.
Corn Sheller.
No. 35,119.
Patented April 29, 1862.
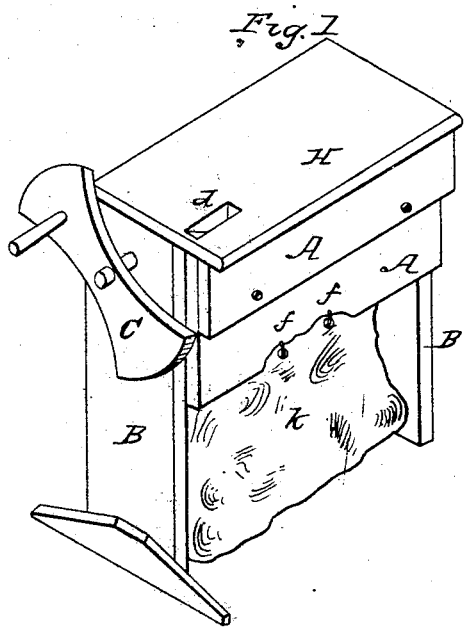
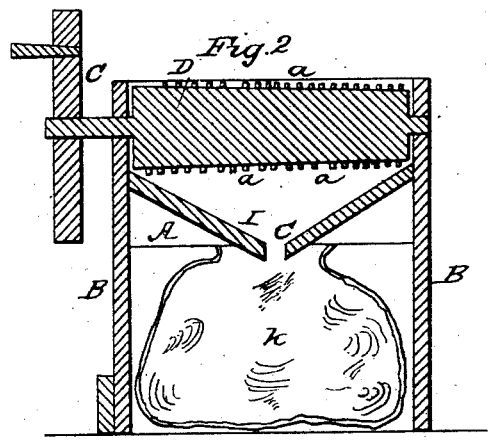
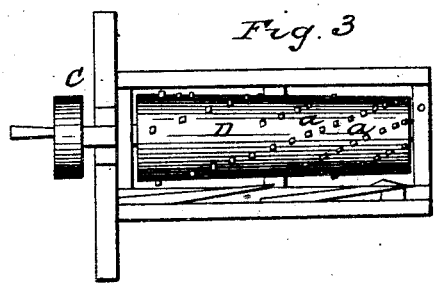
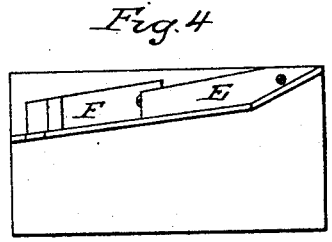
WITNESSES
Joel Wisner
Edw. F. Brown
INVENTOR
George Turner

UNITED STATES PATENT OFFICE.

GEORGE TURNER, OF CAMBRIDGE, OHIO.

IMPROVEMENT IN CORN-SHELLERS.

Specification forming part of Letters Patent No. 35,119, dated April 29, 1862.

*To all whom it may concern:*

Be it known that I, GEORGE TURNER, of Cambridge, in the county of Guernsey and State of Ohio, have invented certain new and useful Improvements in Corn-Shellers; and I do hereby declare that the following is a full and exact description thereof, reference being had to the accompanying drawings, and to the letters of reference marked thereon.

In the drawings, Figure 1 is a view in perspective. Fig. 2 is a plan view. Fig. 3 is a sectional view showing the interior construction. Fig. 4 is a longitudinal vertical section.

To enable those skilled in the art to make and use my invention, I will describe its construction and operation.

In the drawings similar characters refer to like parts.

A is the frame-work; B, the legs; C, the crank-shaft and handle; D, the tapering cylinder with metallic teeth $a$. This cylinder is of wood, and tapers from the crank end to the outer end. The teeth $a$ are arranged upon the cylinder in spiral lines, and are closer together near the small end of the cylinder. The teeth $a$ are set in two series of lines, one of them running the whole length of the cylinder and the other running but half-way.

E and F are the springs against which the ears of corn are pressed by the cylinder. This spring E is set at an angle with the cylinder, having its inner end about opposite the middle of the cylinder and just escaping the teeth. It is so placed that the space between it and the cylinder will at the right-hand or widest part admit the largest ear of corn, while at the narrowest part it will just permit the largest cob to pass out at the opening $b$, made for that purpose. The spring F has a triangular or tapering block, $c$, on its outer end. The corner of this block serves as a balancing-edge, and as the corn passes it it changes the position of the ear, inclining first one end and then the other to the action of the cylinder and teeth.

G is the inclined plane down which the corn passes. The slope of this plane is greatest at that portion of it immediately under the feed-opening $d$ in the lid H. The plane also inclines toward the cylinder to give the ears and shelled corn a tendency toward the spikes $a$. In the lower end of this inclined plane is a notch or groove, $e$, for the passage of the corn.

I is the double-inclined bottom, having a central opening for the escape of the shelled corn.

$f$ are hooks, from which is suspended the sack K for the reception of the shelled corn.

The teeth $a$ are made of steel and are self-sharpening. When they become worn, they can be extracted and the unworn edge can be used. After this they can be reversed, thus using each end of the teeth twice. The teeth are not driven so far in at the large end of the cylinder. The object in having them farther apart at the large end is that this arrangement will make the machine work easier at the start.

In operating my improved corn-sheller the corn, ear by ear, is fed into the machine through the opening $d$, (or a hopper may be used.) The crank is then turned; the ear passes down the inclined plane, which, in connection with the springs, keeps it up against the roller. The teeth $a$ of the roller then catch against the ear, shelling from it the corn, the cob, as it is carried down the inclined plane, being entirely shelled, and delivered out of the machine through the opening $b$, while the shelled corn is carried to but one place, and is deposited in the sack, ready for removal.

What I claim as new, and desire to secure by Letters Patent, is—

The tapering cylinder D, with teeth farther apart on the large end and closer together as they approach the small end, so arranged and operated that the ear of corn shall first be received at the large end of said cylinder and pass toward the small end in process of being shelled, in combination with the springs E and F and inclined plane G, in the manner and for the purposes set forth.

GEORGE TURNER.

Witnesses:
    J. DUNBAR,
    J. O. GRIMES.